United States Patent [19]
Weber

[11] Patent Number: 4,542,460
[45] Date of Patent: Sep. 17, 1985

[54] DRIVING AID INDICATOR FOR ECONOMICAL OPERATION OF AUTOMATIC TRANSMISSION EQUIPPED MOTOR VEHICLE

[76] Inventor: Harold J. Weber, 20 Whitney Dr., P.O. Box 315, Sherborn, Mass. 01770

[21] Appl. No.: 348,775

[22] Filed: Feb. 16, 1982

[51] Int. Cl.$^4$ .................. B60K 41/18; G07C 5/08; G09B 19/16
[52] U.S. Cl. ................ 364/424; 73/862.33; 74/866; 364/424.1; 364/442
[58] Field of Search ............ 364/424, 424.1, 442; 74/866; 73/862.32, 862.33, 862.34, 118

[56] References Cited

U.S. PATENT DOCUMENTS

| | | | |
|---|---|---|---|
| 3,686,935 | 8/1972 | May | 73/118 X |
| 3,922,910 | 12/1975 | Dickinson | 73/118 |
| 3,972,224 | 8/1976 | Ingram | 364/442 |
| 4,008,567 | 2/1977 | Hirsch | 74/866 |
| 4,166,440 | 9/1979 | Helava et al. | 73/118 X |
| 4,224,842 | 9/1980 | Rabus et al. | 74/866 |

FOREIGN PATENT DOCUMENTS 0007881 2/1980 European Pat. Off. ............ 364/442

OTHER PUBLICATIONS

Johnson, Jr.: A Guide to Torque Transducers, Control Engineering, Aug. 1973, pp. 47-49.

Primary Examiner—Felix D. Gruber

[57] ABSTRACT

Driving aid apparatus for determining the best, most economical operating conditions for a motor vehicle equipped with an automatic transmission. The input member rotational rate of a torque converter coupled with the automatic transmission is measured. The rotational rate of the output member of the torque converter is also measured. A distinct difference may normally exist between these two rates, when a load is applied to the torque converter output, due to "slip" through the torque converter. The extent of this slip is in part proportional to the torque transmitted through the torque converter and, therefore, by a determination made from the difference between the two rates in combination with other key parameters affecting torque converter performance, the relative engine output torque can be found. Through utilizing this relative torque factor, in combination with other engine parameter signals such as manifold vacuum, operating temperature, and throttle position, the relative operating steadiness and net efficiency of the instant operating conditions of the overall vehicle is derived and displayed for the driver. This display enables the driver to operate the vehicle in a manner leading to uniform performance and maximum fuel economy. Through a control available for driver adjustment, the computed indicator responses are further modified to best suit the driving habits of the driver. A unique vehicle performance profile memory adds the dimension of tailoring the computed responses to the exact performance characteristics of the attendant vehicle.

24 Claims, 15 Drawing Figures

DRIVING AID INDICATOR FOR ECONOMICAL OPERATION OF AUTOMATIC TRANSMISSION EQUIPPED MOTOR VEHICLE

BACKGROUND OF INVENTION

My invention shows a driving aid useful in a motor vehicle having an automatic transmission coupled between the engine and the wheels of the vehicle. With the advent of ever increasing energy costs for gasoline, diesel fuel and other portable organic fuels, much concern centers on improving the attainable fuel milage from the automobile, truck, and other vehicles. In particular the highway milage and commuting milage of such vehicles has been given much attention in recent times. This is conveyed even more forcefully by government mandated deadlines on overall improvement in "fleet" fuel milage which must be met by every manufacturer of automobiles, and eventually by most other motor vehicles.

The use of a standard manual shift transmission in lieu of an automatic does afford an improvement in milage, but the basic inconvenience of the manual shifting and the use of the clutch makes the automatic transmission far more preferable by a large segment of the driving population, even at the sacrifice of additional operating cost. My invention now addresses the urgency of aiding the driver of an automatic transmission equipped vehicle to attain overall economy of operation approaching that of a manual shift transmission.

In the conventional automobile and truck which includes an automatic transmission, the usual automatic transmission further includes a torque converter component. The automobile type internal combustion engine, whether gasoline or diesel powered, can normally be expected to operate at near peak efficiency, and therefore with best fuel milage economy, when it is delivering about a constant torque into its load. Since the automatic transmission is already fitted with a torque converter, a measurement of the delivered absolute torque can be derived by computing the slip through the torque converter. The slip is the difference in the instant converter output member rotational rate relative to the input member rotational rate and is largely proportional to the absolute torque demand coupled through the converter at higher vehicle speeds. This slip may be conveniently measured by deriving the difference between the engine r.p.m. speed and the effective torque converter output member rotation rate. In the conventional construction of a unitized automatic transmission and torque converter, the torque converter is mounted directly onto the input shaft of the gearbox portion of the automatic transmission. This makes direct access to the rotating output member of the torque converter inconvenient. The output shaft from the transmission gearbox usually couples to the vehicle driveshaft and to the differential and wheels of the vehicle. When the gearbox effective output driveshaft rotation rate is measured and compared with the engine output member r.p.m. speed, and the mechanical gear ratio obtained through the transmission gearbox is allowed for, the absolute slip through the torque converter is provided as derived information. Through the expedient of computing the converter slip, which reflects relative torque and which furthermore can be adapted to allow for different values of normal slip through the transmission which may be proportionally related to the instantaneous speed and other factors such as transmission temperature, a very accurate indication can be provided to the driver or operator of the vehicle as to when he is driving in such a manner as to enhance his fuel economy.

A constant torque measuring system, such as this novel driving aid provides, teaches uniform driving habits and goes beyond merely saving fuel and thereby saving the vehicle operator much money. It also acts to reduce the strain on the mechanical components of the vehicle. In particular the clutches in the automatic transmission see less abuse. The tires on the vehicle also see a relatively constant torque demand and thereby tire wear due to slippage with the drive surface may be somewhat reduced.

A driver adjustable "PERFORMANCE SELECTOR" affords an entirely new dimension of a driving aid's ability to meet the driving habit demands of an individual driver, allowing for several degrees of economical driving performance as traded off with acceleration and speed of the vehicle. This novel ability to tune the driving aid to the drivers habits is believed to make the applicability of the invention far more universal, acceptable by a broad spectrum of the driving population.

In so far as is known to me, no other device provides a driver with a real-time, on-road indication of the relative constancy of torque delivery by the engine to the load. Moreover, no prior system is known which effectively measures the engine r.p.m. thereby producing a signal which combines with a signal produced by measuring the automatic transmission torque converter output shaft rotation rate to provide a computed signal proportional to the apparent torque being delivered by the engine to the load. Additional novelty of the invention includes the combining of engine or transmission temperature and engine manifold vacuum pressure to modify the derived indication in order to correct for slip relatable factors affecting the accuracy of the computed torque signal and to skew the indication favorably to maximize not only the vehicle's fuel performance, but also its acceleration and other driving characteristics.

SUMMARY OF INVENTION

My new invention describes a driving aid which serves to provide the operator of an automatic transmission equipped motor vehicle with an in situ display indication which can guide him towards achieving uniform performance and a maximum level of fuel economy. Through faithful observation of driving aid indications, fuel milage may be obtained from an automatic transmission equipped motor vehicle which approaches that of a motor vehicle equipped with a standard manual gearshift transmission and clutch.

It is well known that many of the inefficiencies of an automatic transmission equipped car, and the fuel economy losses attendant therewith, are wrought by poor driving habits, in particular nonuniform acceleration and overspeeding performance tend to cause dramatic fuel consumption increases. The unrestricted driving of an automatic transmission equipped vehicle which is overloaded also leads to engine and transmission strain and excessive fuel consumption, because the torque converter and transmission gear ratio combinations are not optimum for the loading condition. The instant invention most simply alerts the operator that he is in fact overloading the torque converter in the automatic transmission, irrespective of cause. How such alerting is accomplished is the essence of the new invention, and therein lies the novelty which can afford dramatic improvement in vehicle fuel economy and the attendant conservation of our natural resources.

Through the essential measurement of engine r.p.m. speed together with the torque converter output member rotation rate, the later of which is most conveniently measured, albeit indirectly, at the output of the attendant gearbox, and further through the expedient of logically combining these two key signals and deriving an error therefrom, an instantaneous slip function signal is produced. This slip function signal in effect becomes the indication drive signal to telltale the operator as to what the relative slip factor is because, broadly stated, the best overall performance is achieved under relatively steady driving conditions when there is relatively small but constant slip. It is the further refinement of this indication which enhances the novelty of my invention in that the slip factor requires certain refinements relative to the engine load, the vehicle's load, and operating temperatures. The individual vehicle's best performance characteristics (as intended by the manufacturer) also enters into the telltale signal value. Further refinement is attained by providing an additional variable input in the form of a driver adjustment which can modify the compute slip factor signals, thereby effectively producing a better or less good telltale indication to the driver.

It is therefore a purpose of the invention to describe a driving aid which may interpret the torque converter input member rotational speed signal in comparison with a signal representing the effective rotational speed of the torque converter output member, and through combination with several other engine and transmission parameter signals, determine the operating conditions of the vehicle and telltale these conditions to the driver.

It is yet another purpose of the invention to provide a driving aid which has an adjustable control to enable the driver to compensate the indications to best suit his driving habits.

Still another purpose of the invention is to describe a driving aid apparatus which includes a vehicle performance profile memory which enables the resultant indications to be tailored to the unique characteristics of the attendant motor vehicle, which may further be in accord with the manufacturer's design objectives.

A further object of the invention is to teach apparatus that combines signals representing the input member rotational rate and the output member rotational rate of a torque converter together with one or more other parameter indications, including manifold vacuum, engine temperature, transmission temperature, throttle position, shift status of the gearbox, and brake function signals and successfully compute therefrom a composite signal which may be modified by a performance selector adjustment which is settable by the operator of the vehicle. This composite signal is then coupled through a vehicle performance profile which combines the various components of the composite signal to produce a driving aid indication to the operator which is predetermined to show the best operating conditions for the vehicle in relation to the various inputs.

It is clearly another object of the invention to provide the driving aid which includes an electronic signal processor receiving several signals which are a measure of the rotational speeds of the input member and the output member of the torque converter attendant with the automatic transmission and other engine and vehicle status signals, to combine all these signals in a predetermined pattern, which is in part preset by a vehicle performance profile memory, and in part preset by an operator adjustment with the result that all of the several factors that are brought into play as input signals collectively produce an output signal which serves to give the driver of the vehicle an indication of the best driving conditions providing uniform performance which may lead to maximum fuel economy.

And still another object of the invention is to provide an electronic signal processor which is cooperative with the engine and automatic transmission or an automobile and, receiving power from the usual vehicle battery, produces a driver indication that leads to the most uniform and economical operation of the vehicle's particular combination of engine and transmission.

DESCRIPTION OF INVENTION

My new invention is a driving aid for a motor vehicle such as an automobile which is equipped with an automatic transmission for coupling power between the engine and the vehicle driving wheels. Such an automatic transmission usually includes a torque converter which couples between the engine crankshaft, i.e. the flywheel, and the transmission gearbox. I have discovered that through novel means of sensing and combining signals which are a measure of engine rotational speed coupled to the input of the torque converter and a measure of the torque converter output member rotational rate, an error signal is derived which is proportional to the slip of speed through the torque converter.

Since the characteristic of a torque converter is to produce a finite slip factor for a given torque condition translated therethrough and for a given condition of overall rotational speed, with all other factors being constant. This measurable slip factor may be brought together with other signals from the engine and the vehicle from which an instant value may be computed which can serve to provide the operator with a signal indication denoting the best driving conditions for achieving maximum fuel economy.

Figure 1:
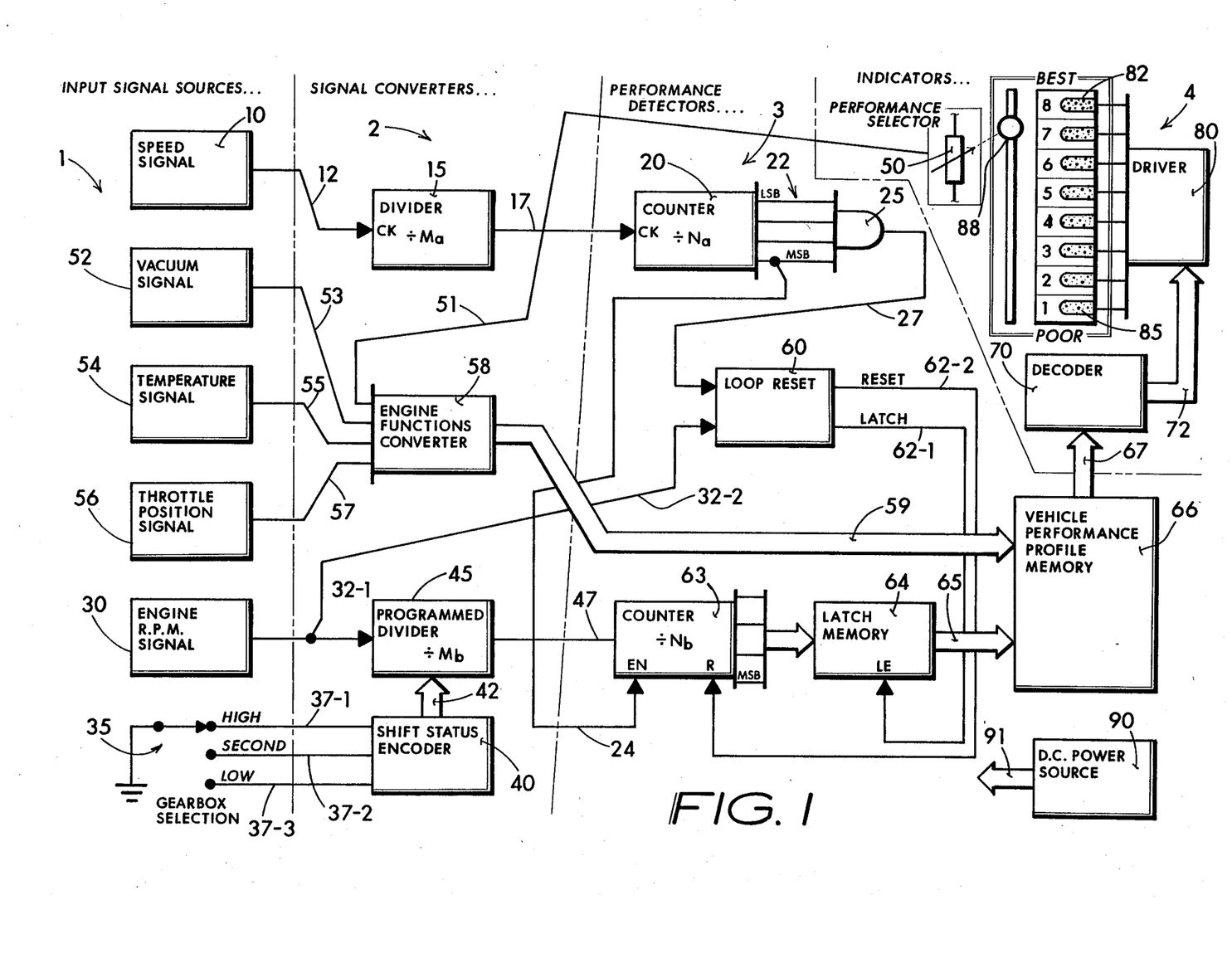
FIG. 1 Overview of the gist of my invention showing several input signal sources, the signal converters, the performance detectors, and the indicators.

The gist of my new invention appears in FIG. 1. Several signal source inputs 1 are shown to include:

speed signal 10 which is proportional to the output member rotational rate of the torque converter and is usually related to the vehicle road speed;

a gearbox shift status signal 35 which couples with several gearbox shift combinations of typically "HIGH" 37-1, "SECOND" 37-2, or "LOW" 37-3;

vacuum signal 52 which is the intake manifold vacuum of the typical internal combustion engine;

temperature signal 54 which is a sensor responsive to the engine operating temperature and alternatively a temperature sensor responsive to the transmission torque converter fluid temperature; and, throttle position signal 56 which couples with the carburetor throttle mechanism. Also a first signal representative of the engine r.p.m. 30 is provided and may be conveniently derived from sensing the rotational speed of the torque converter input member, i.e. the crankshaft or the like of the engine; or else the engine r.p.m. may be derived from the ignition pulses of the usual spark ignited internal combustion engine. The signal converters 2 include a divider 15 preset to divide by $M_a$ which receives the first speed signal pulses 12 and produces a proportional first speed signal output 17. The engine functions converter 58 is a combining element that receives performance selector setting information 50 as preset by the operator (selection obtained by finger knob 88 located on the vehicle dashpanel). Also, the vacuum signal 53, the temperature signal 55, and the throttle position signal 57 each couple with the engine function converter. The engine r.p.m. speed signal 32-1 couples with the programmed divider 45 preset to variously divide by factor $M_b$ as preset by the signals arriving from the shift status encoder 40 on control lines 42.

The performance detector 3 is a processing logic unit which includes a counter 20 preset to divide by $N_a$, receiving clock pulses 17 which are proportional to speed and producing a plurality of binary outputs 22 which through gating means 25 periodically produces a pulse on line 27 which couples to the loop reset 60. When counter 20 is preestablished as a four bit counter, a pulse appears on line 27 for every 16 pulses appearing on line 17. Yet another counter 63 which serves as a first combining means effective to produce a slip signal at its output having a binary weight proportional to the slip induced difference between the first signal effective torque converter input member r.p.m rate and the second signal effective torque converter output member r.p.m. rate is preset to divide by $N_b$ and receives engine r.p.m. pulses 47 for being periodically reset by a signal 62-2 from the output of the loop reset function 60. Furthermore counter 63 is enabled by signal 24 only when the MOST SIGNIFICANT BIT (MSB) of counter is active. In effect, counter 63 commences counting only after counter 20 has completed the first half of its count cycle. The signal appearing at the output of counter 63 has an instantaneous value proportional to the torque induced slip through the torque converter and couples with a latch memory 64 which is enabled by signal 62-1 derived from the loop reset 60. The latched output 65, which is a byte representing the several binary states of the slip signal appearing at the output of counter 63 just prior to the reset of counter 63, and therefore stands as a signal representative of slip measured between the input and output members of the torque converter, is coupled into several of the address input lines of the memory 66 (VPPM), which is also addressed by the engine functions converter 58 by way of several remaining address lines 59. The input address combination afforded by utilizing the latched output byte 65 as a portion of the memory address word, whilst the engine functions converter output byte appearing on signal line 59 serves to effectively combine the slip signal value and the engine signal value into a unique address combination for the VPPM. The VPPM is preprogrammed to reflect the optimum operating performance conditions for the vehicle into which the driving aid is installed. The memory's unique profile is central to the performance flexibility of the new invention, in that it enables the adaptation of a relatively low cost mass produced, standardized device to have characteristics which are best matched to the requirements of the vehicle into which it is installed. The output 67 of the VPPM 66 couples with the address input of a decoder 70 which converts the binary format words from the memory into an indicator drive format signal 72, and by way of driver 80 serves to excite one of the several indicators 82 comprising the display assembly 85.

The result of this combination is that the display 85 variously lights the indicators 82 in proportion to the economy of the driving conditions the vehicle is instantly encountering. Therefore when the BEST vehicle operating conditions are encountered, indicator "8" is lit, whilst as performance conditions deteriorate, indicators "7" down through indicator "1" regressively light. The setting of the selector knob 88 by the driver, through interaction with the performance detectors, produces a modification of the driving requirements necessary to achieve lighting of any specific indicator stages. When the operator has the knob 88 towards the BEST end, he will have to drive much more conservatively (and thereby more economically) to ever light indicator "8" than what he has to do should he have the knob 88 set towards the POOR end of its range. When the knob 88 is towards the POOR end of the range, however, vehicle acceleration can be more brisk and speed variation tolerance is broader insofar as the indication is concerned.

D.c. power source 90 is coupled with the vehicle battery to provide d.c. operating potentials for the necessary circuits comprising the new driving aid.

Figure 2:
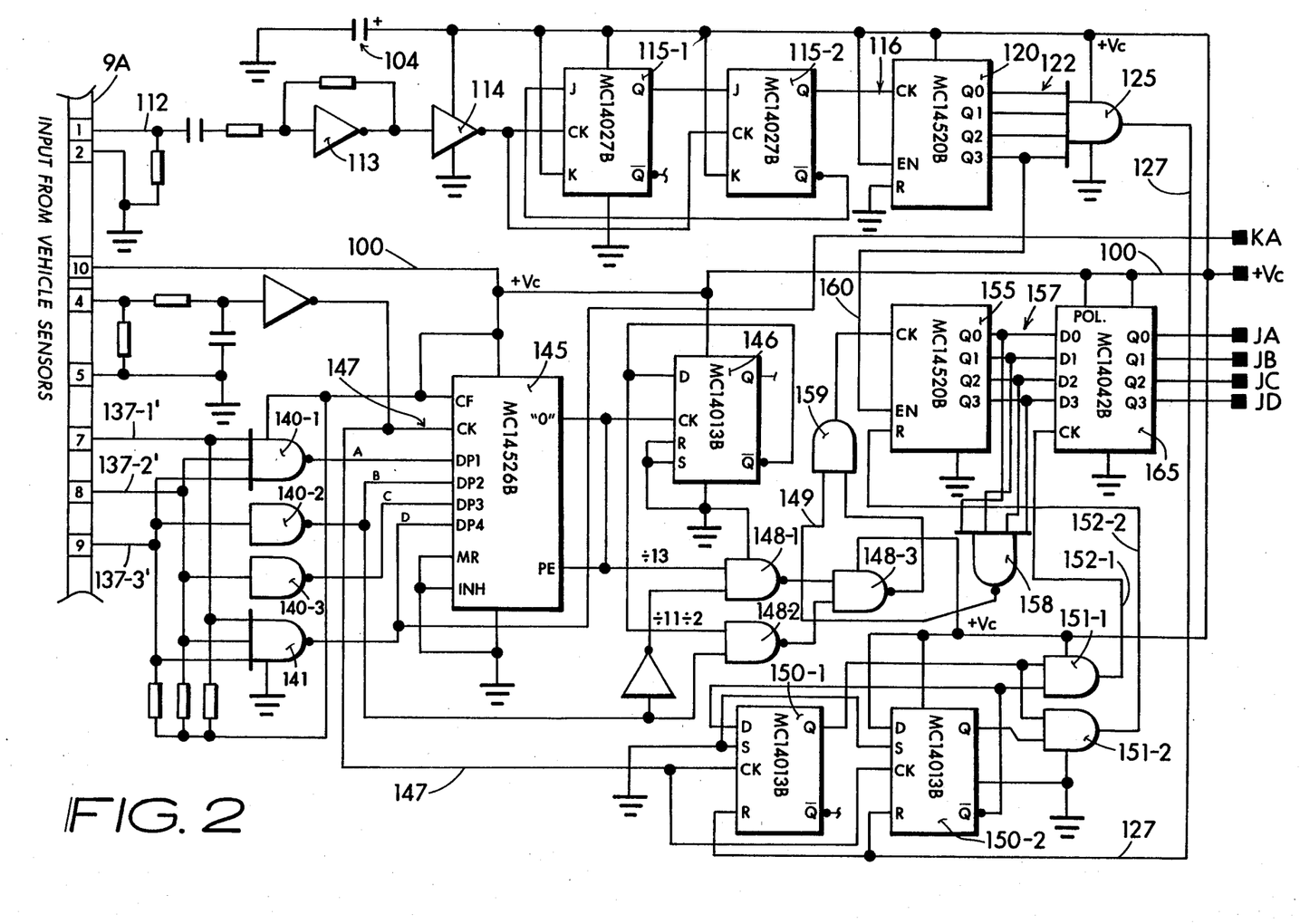
FIG. 2 Electrical diagram for the torque converter coupling slip detector.

Vehicle speed signal pulses are coupled to terminal 1 of connector 9A in FIG. 2, which are amplified by the C-MOS (e.g., type CD-4069B or equivalent) inverter 113 operating as an amplifier, next coupled with inverter 114, resulting in speed pulses appearing on the CLOCK input of J-K flip-flop 115-1. Flip-flops 115-1, 115-2 comprise a divide-by-three counter $M_a$, the periodicity of the pulses on output 116 connected to the CLOCK input of the four-bit counter 120 being ⅓ the periodicity of the CLOCK pulses at the output of inverter 114. The counter 120 outputs 122 combine in AND gate 125, producing a HIGH pulse on the output line 127 for every sixteen clock pulses received on line 116, or every fortyeight speed pulses from the output of inverter 114.

The arrangement depicted is adapted for a Chrysler Corporation type 904 automatic transmission, as used in certain American Motors Corporation products (e.g., the "Pacer" and "Concord" models), having a gearbox ratio $G_R$ of:

"LOW" 2.45:1
"SECOND" 1.45:1
"HIGH" 1.00:1

With a six cylinder engine providing r.p.m. pulses $E_P$ on terminal 4 of connector 9A, 3 pulses occur for each crankshaft rotation of the four cycle engine. Therefore the counting for the signal converter functions can best be obtained in the following order:

$$G_R \times E_P \times M_a = M_b,$$

so:

| SHIFT | $G_R$ | $E_P$ | $M_a$ | $M_b$ | COUNT $M_c$ |
|---|---|---|---|---|---|
| "HIGH" | 1.00 × | 3 × | 3 = | 9.00 = | 9 |
| "SECOND" | 1.45 × | 3 × | 3 = | 13.05 = | 13 |
| "LOW" | 2.45 × | 3 × | 3 = | 22.05 = | 11 × 2 |

Where $M_b$ is the programmable divider 145 preset condition. The shift status signals 137-1', 137-2', 137-3' couple with NAND gates 140-1, 140-2, 140-3, 140-4 to establish the necessary preset inputs to the divider 145, according to:

| SHIFT | $M_c$ | DIVIDER 145 INPUTS | | | |
|---|---|---|---|---|---|
| | | DP-1 | DP-2 | DP-3 | DP-4 |
| "HIGH" | 9 | 1 | 0 | 0 | 1 |
| "SECOND" | 13 | 1 | 0 | 1 | 1 |
| "LOW" | 11 × 2 | 1 | 1 | 0 | 1 |

Flip-flop 146 is a divide-by-two divider clocked from the output of divider 145. When LOW is selected and $M_b=22.05$, the divider 145 divides by 11 and the divider 146 is steered by the selector function including NAND gates 148-1, 148-2, 148-3 to combine the modulo of the dividers 145 and 146 and thereby provide a COUNT $M_c$ divide-by-22 $M_b$ signal on the output of gate 159 as coupled to the counter 155 CLOCK input. The outputs 157 of the counter couple with a quad latch 165. The "D" flip flops 150-1, 150-2 provide a loop reset function, wherein when a HIGH pulse appears on line 127, the flip-flop will be reset or initialized. Immediately when the line 127 signal returns LOW, the next clock pulses on line 147 advance the flip-flops hooked up as a quasi divide-by-four counter to first produce a LATCH pulse 152-1 on the output of AND gate 151-1, followed by a RESET pulse 152-1 on the output of AND gate 151-2. The sequence is such that the latch 165 will STORE the byte 157 states just prior to reset of counter 155.

In the described hookup, with increasing ratio relationship between the torque converter output (vehicle) speed and the converter input (engine) speed, the latch 165 outputs are:

| TORQUE CONVERTER SLIP | LATCH 165 OUTPUTS | | | |
|---|---|---|---|---|
| | JA | JB | JC | JD |
| >0% | 0 | 0 | 0 | 1 |
| >6.25% | 1 | 0 | 0 | 1 |
| >12.5% | 0 | 1 | 0 | 1 |
| >18.75% | 1 | 1 | 0 | 1 |
| >25% | 0 | 0 | 1 | 1 |
| >31.25% | 1 | 0 | 1 | 1 |
| >37.5% | 0 | 1 | 1 | 1 |
| >43.75% | 1 | 1 | 1 | 1 |

And therefore, when the 43.75% count 1111 is reached, NAND gate 158 produces a signal on line 159 inhibiting clock pulses from counter 155, holding the 43.75% "worst case" count.

Figure 3:
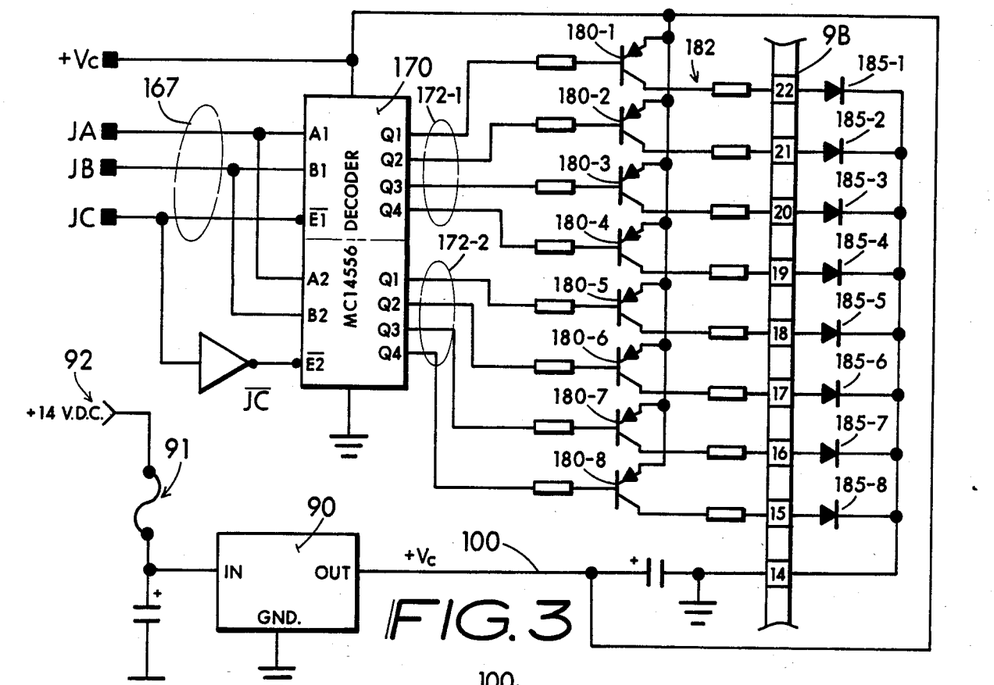
FIG. 3 Display decoder and drive circuit, together with d.c. power source.

The decoder arrangement for a bar-graph type display of driving efficiency is shown in FIG. 3. A Motorola Semiconductor Corporation type MC-14556B decoder integrated circuit is enlisted as the decoding function for receiving latched signals JA, JB, JC on line 167' producing oututs on lines 172-1, 172-2 which through the PNP driver transistors 180-1 through 180-8 serves to connect with, and drive the correspondent light emitting diode (LED) 185-1 through 185-8. When the inputs 167-40 are JA=0, JB=0, JC=0 the output Q1 of lines 172-1 serves to drive transistor 180-1 and LED 185-1 through resistor 182, thereby lighting the "BEST" LED 185-1. This decoding function progresses through the various line 167' states received from the latch and illuminates whichever one of the eight exampled LED lamps are selected by the various JA, JB, JC binary states. An integrated voltage regulator 90 provides a $+V_c$ potential of usually +5 volts on line 100. The primary power is usually derived from the vehicle battery source 92 through fuse 91.

Figures 4, 5:
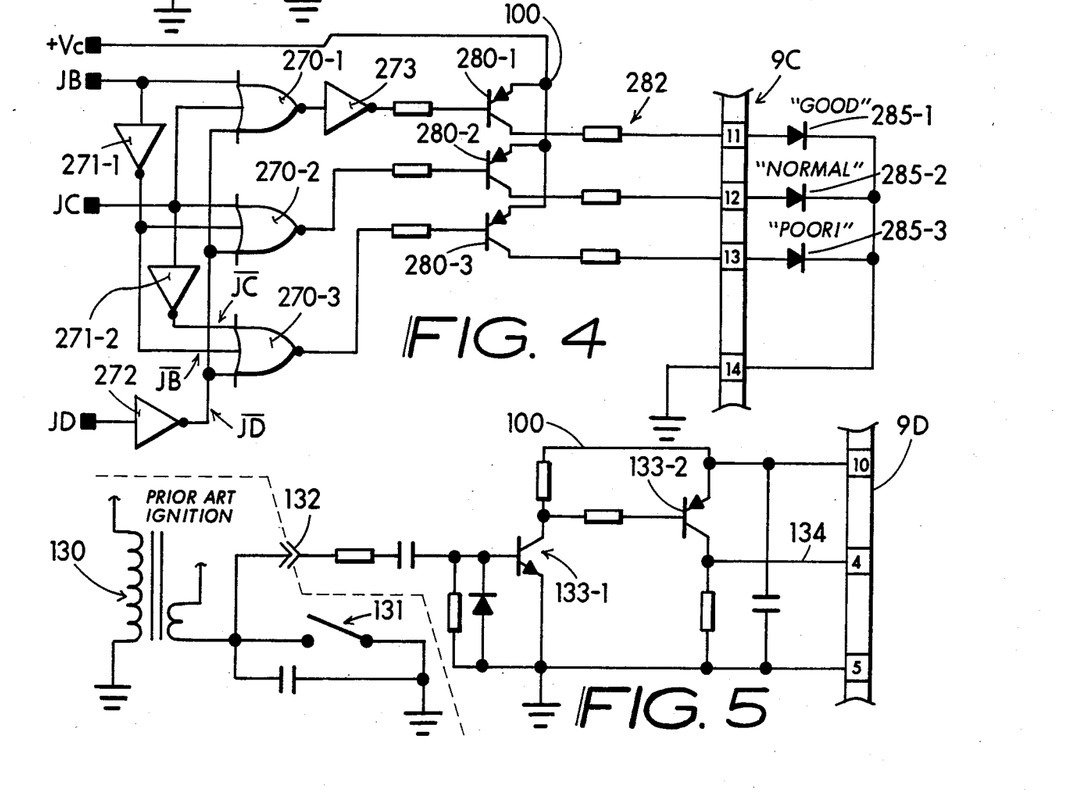
FIG. 4 Indicator decoder and drive circuit.
FIG. 5 Alternative indicator decoder and drive circuit.

The decoder giving three indications of "GOOD", "NORMAL", and "POOR!" is shown in FIG. 4. The JB, JC signal lines decode as follows:

| INPUTS | | OUTPUT INDICATION | TORQUE CONVERTER SLIP |
|---|---|---|---|
| JB | JC | TO DRIVER | |
| 0 | 0 | ---"GOOD"--- < | 12.5% |
| 0 | 0 | | |
| 1 | 0 | ---"NORMAL"--- < | 25% |
| 1 | 0 | | |
| 0 | 1 | ---"POOR!"--- > | 25% |
| 0 | 1 | | |
| 1 | 1 | | |
| 1 | 1 | | |

The OR gate 270-1 responds to the "GOOD" decode signal, the NOR gate 270-2 responds to the "NORMAL" signal, whilst the NOR gate 270-3 responds to the "POOR!" signals. Inverters 271-1, 271-2 provide necessary decoding sense. Each gate output couples with a display drive transistor 280-1, 280-2, 280-3 which through connector 9C couples with the appropriate LED lamp 285-1, 285-2, 285-3.

FIG. 5 shows the hookup of the invention with the usual automotive ignition system, including an ignition coil 130, points 131, and a connection 132 which through protective components, couples to the base of NPN transistor 133-1, and therefrom by way of the collector circuit to the base of a second PNP transistor 133-2 whereby the second transistor collector circuit is returned to ground through a relatively low resistance on the order of 470 ohms, providing an output on pin 4 of connector 9D that couples with the corresponding input of connector 9A in FIG. 2. The ignition pulses occurring when the points 131 open are effectively "amplified" by the cascade transistors and provide a pulse train on terminal 4, the rate of which is proportional to engine r.p.m. In the usual four cycle internal combustion engine, the pulse rate is:

$$\text{Pulse Rate} = \frac{\text{r.p.m.} \times \text{no. cylinders}}{2 \times 60} = \text{Hertz}$$

and for the exampled six cylinder engine, this becomes:

$$\text{Pulse Rate} = \frac{\text{r.p.m.} \times 6}{120} = \text{Hertz}$$

Figure 6:
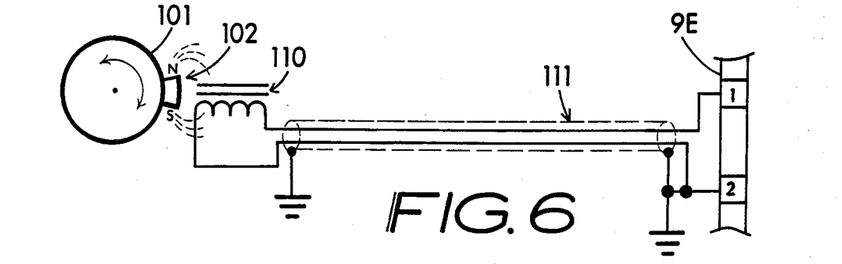
FIG. 6 Magnetic pickup sensor for detecting vehicle driveshaft rotation rate.

The output driveshaft from the transmission gearbox 101 is shown to include a magnet 102 in FIG. 6 which cooperates with an induction pickup 110 to provide pulses delivered by cable 111 to terminal 1 of connector 9E which corresponds with the input of connector 9A of FIG. 2. The pulses from the shown arrangement represent one pulse for every rotation of the gearbox output shaft.

Figure 7:
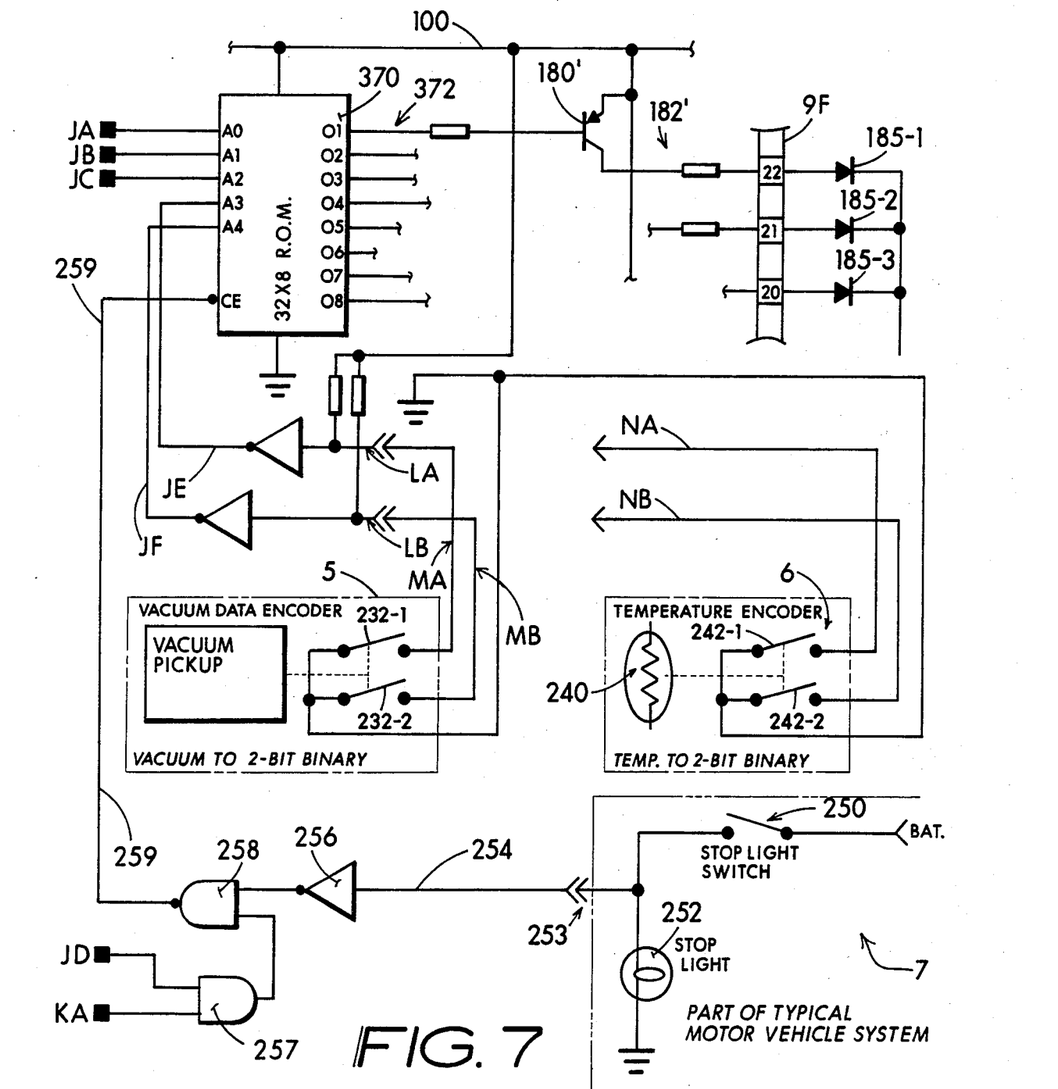
FIG. 7 Electrical diagram showing a read-only-memory variously addressed to modify telltale guidance.

The vehicle performance profile memory 370 in FIG. 7 includes the LSB inputs JA, JB, JC that couple from the latch 165 outputs. The memory positions are addressed in accord with the count accumulation in counter 155. The MSB inputs JE, JF couple from a vacuum data encoder 5 which may comprise two switches 232-1, 232-2 serving to produce a four level binary code on lines MA, MB, coupled with lines LA, LB of the memory. The vacuum pickup may produce several different two bit binary combinations in response to the variations of the vacuum produced in the intake manifold of the attendant engine. This vacuum variation can serve to reflect engine loading (engine performance). Through the varied addressing of memory 370, the unique performance profile signature of the vehicle stored in the memory is appropriately addressed, producing outputs 372 that turn on the several indicant drive transistors 180', coupled to the LED 185-1 indicators through resistors 182'. The figure also shows the use of a temperature encoder 6, including a sensing element 240, producing a four level, two bit binary output through switches 242-1, 242-2 on lines NA, NB. The encoded temperature of the engine, or alternatively the temperature of the transmission, may couple into the MSB inputs of the memory 370.

The typical motor vehicle includes a stop light switch 250 and lamp 252 that, by way of a connection 253, produces a HIGH on line 254 whenever the stoplight is activated. The HIGH signal is inverted 256 and couples by way of NAND gate 258 and line 259, to the chip enable $\overline{CE}$ input of memory 370. Whenever the brake is applied to the vehicle, the chip enable line goes HIGH and the memory outputs are disabled.

AND gate 257 which connects with NAND gate 258 includes an input JD which responds to an overcount of counter 155 that occurs when the vehicle is not moving, i.e. the emergency brake is "set" or it is otherwise stalled, and therefore an extraordinary difference between the r.p.m. and vehicle speed relationship exists. Likewise the KA input couples from a combinatorial NAND gate 141 that produces a LOW on line KA whenever no gearbox selection is enabled.

Figure 8:
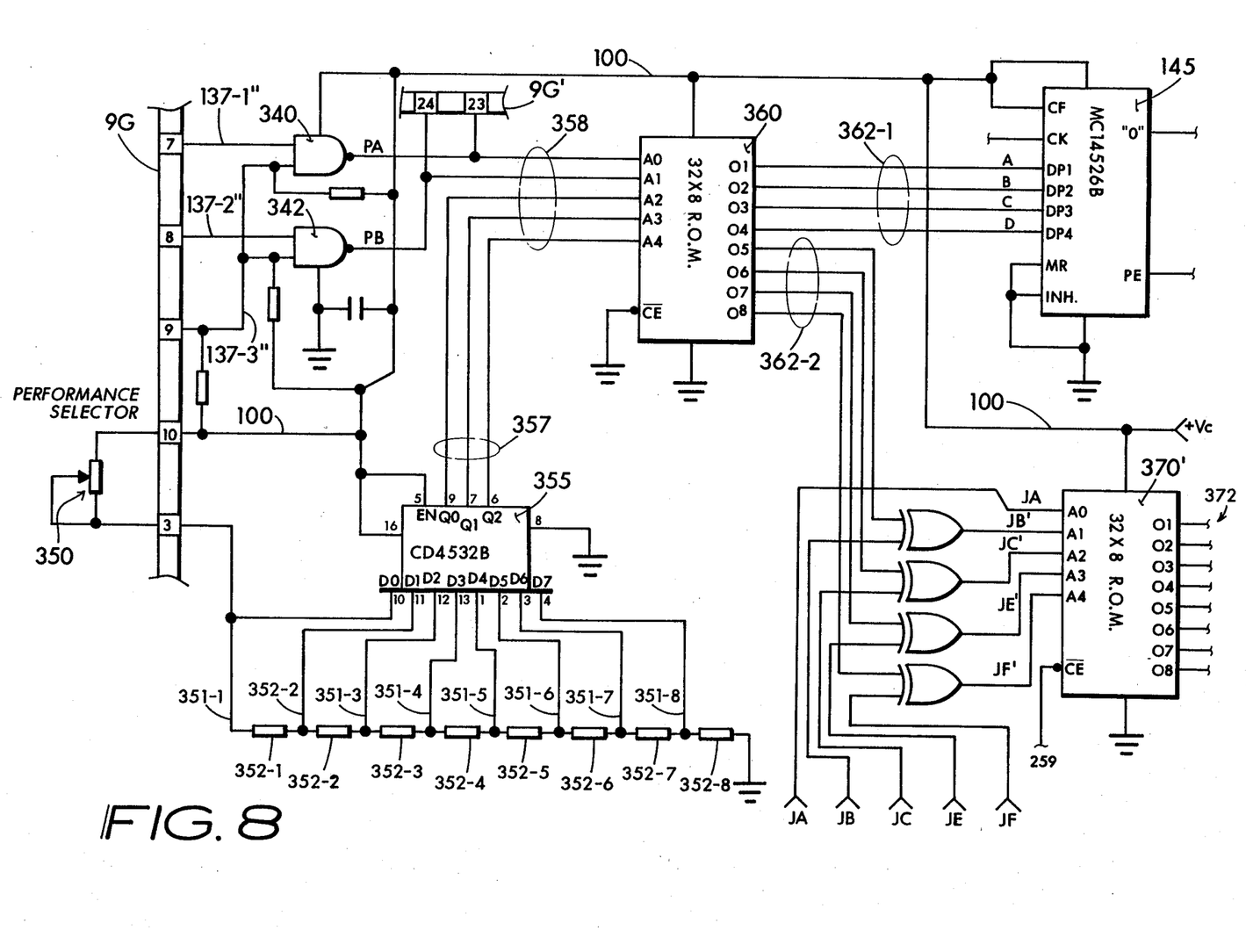
FIG. 8 Electrical diagram for including a performance selector control connected with memory address.

An additional memory 360 shown in FIG. 8 adapts with the circuitry taught in FIG. 2 and is utilized to control the preset input states of the earlier shown counter 145. The preset values are scheduled by the setting of a performance selector control 350 conveniently dashboard mounted near the driver for ready, fingertip manipulation even while driving. The three separate gearbox selection signals 137-1", 137-2", 137-3" couple through connector 9G pins 7, 8, 9 with corresponding pins of the connector 9H of FIG. 10 and are adapted by NAND gates 340, 342 (which supplant the functions of gate 140 of FIG. 2) to produce a two bit binary output PA, PB connecting with the $A_0$, $A_1$ LSB bit inputs of memory 360. The performance selector 350, shown as a rheostat, acts in conjunction with resistors 352-1 through 352-8 to provide a series of voltage increments at each of junctures 351-1 through 351-8 which couple to the data inputs $D_0$ through $D_7$ of the priority encoder 355. The priority encoder is a C-MOS device and therefore each data input is effectively voltage responsive, as well as being logic level responsive. It is this important characteristic of voltage level responsiveness unique to the C-MOS device such as the shown CD-4532B which is utilized to produce a pseudo analog-to-digital conversion of the various voltage levels connected to the priority encoder inputs. The result is a three bit, eight level output signal 357 coupled with the three MSB inputs $A_2$, $A_3$, $A_4$ of memory 360. The five inputs 358 coupled to the memory serves to produce thirtytwo combinations of eight bit words at the output of the memory 360. Four of the bit lines 362-1 couple to the data preset inputs of the aforedescribed presettable counter 145 in lieu of the signals obtained from the earlier shown gates 140, whilst the remaining four bit lines 362-2 couple to the inputs of four EXCLUSIVE-OR gates. The other input of each EXCLUSIVE-OR gate may couple with the JB, JC, JE, JF signals respectively, and combine with the signals on lines 362-2 to produce unique combinations of signals JB', JC', JE', JF' that, together with the JA signal address the five inputs of the memory 370' which serves about the same function 370 described for FIG. 7. It is clearly evident that the various combinations of signals derived from the gearbox selection signals and the performance selector signals provided on dataline 358 act to uniquely modify the guidance indication provided the driver in accord with the memory instructions written into memory 360, together with the memory instructions written into memory 370'. Through the combination of these memory instructions, which can be obviously combined into a single memory device by an astute artisan, a unique vehicle performance profile signal can be provided that is also modifiable by the operator's choice through the various settings of the performance selector 350. This enables the precise tailoring of the guidance indication to best suit the driving habits of the individual operator of the vehicle.

Figure 9:
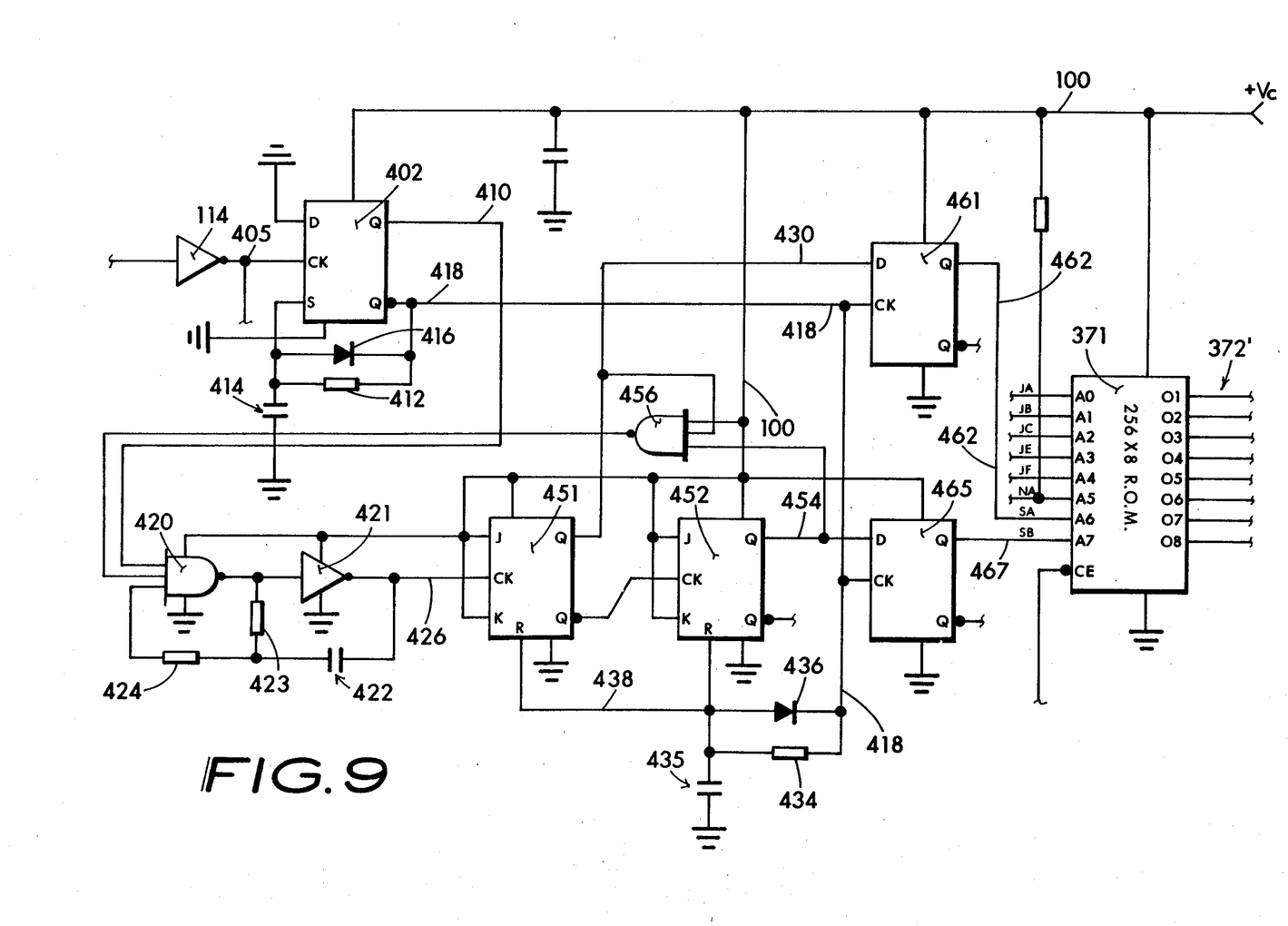
FIG. 9 Electrical diagram for responsive circuit that provides four distinct speed categories for memory address thereby modifying telltale guidance in proportion to vehicle travel speed.

The modification of the guidance indication in accord with the vehicle's relative road speed is provided by the circuit of FIG. 9. A signal proportional to the torque converter output member rotational speed appears at the output of inverter 114 at connection 405 that connects with the clock CK input of the "D" flip-flop 402. The flip-flop is operative as a one-shot multivibrator, and when a clock pulse occurs, the leading positive edge transfers the LOW signal level on the "D" input to the Q output. The Q̄ output therefore goes HIGH. This HIGH level on line 418 acts to charge capacitor 414 through resistor 412. When the capacitor 414 is sufficiently charged, the HIGH level at the SET input of the C-MOS flip-flop presets the flip-flop conditions such that the Q output is again HIGH, whilst the Q̄ is LOW. When preset, the HIGH signal on line 410 enables the multivibrator comprising NAND gate 420 and inverter 421 which, together with capacitor 422 and resistors 423, 424, acts as an oscillator producing clock pulses on line 426 which serve to advance the states of a two bit counter comprising the "J-K" flip-flops 451, 452. As the clock pulses occur, the binary states on the Q output of the two flip-flops advance through the usual two bit binary sequence. The frequency of the clock pulses are set to be about four times the frequency of the incoming pulse rate on line 405 provided at the lowest frequency speed response. By way of example, the following table illustrates the shift responses and frequencies in a typical vehicle application:

| VEHICLE SPEED | DRIVE R.P.M. | "SPEED" FREQUENCY |
|---|---|---|
| 15 MPH | 645 | 10.75 Hz |
| 30 MPH | 1,290 | 21.5 Hz |
| 45 MPH | 1,935 | 32.25 Hz |
| 60 MPH | 2,580 | 43.0 Hz | therefore the clock frequency on line 426 may be about $4 \times 10.75$ Hz = 43 Hz.

The NAND gate 456 is a state detector. When each of the Q outputs are HIGH, i.e. the fourth count state occurs, the NAND gate produces a LOW output that stops the clock oscillator through connection with NAND gate 420. The essence of this device is to allow the two bit counter to advance to one of its four states between the incoming speed signal pulses which serve to reset the counter. Just prior to counter reset, the high state on line 418 clocks the input of each "D" flip-flop 461, 465. This transfers the instant data input levels on lines 430, 454 to the Q outputs 462, 467 which serve to address the MSB inputs of memory 371, whilst the LSB inputs are addressed from the JA, JB, JC, JE, JF, and NA signals provided from the teachings of the earlier figures. The result is a combination of signals on the output lines 372' that are modified not only by the prior taught signals, but also by the four combinations of speed response signals SA, SB. When the signal on line 418 goes HIGH the capacitor 435 is also charged by way of resistor 434. When the charge accumulation is sufficient, the HIGH on line 438 resets the two flip-flops forming the two bit counter. When the signal on line 418 returns LOW, diode 436 immediately discharges capacitor 435 and the two bit counter resumes counting.

Figure 10:
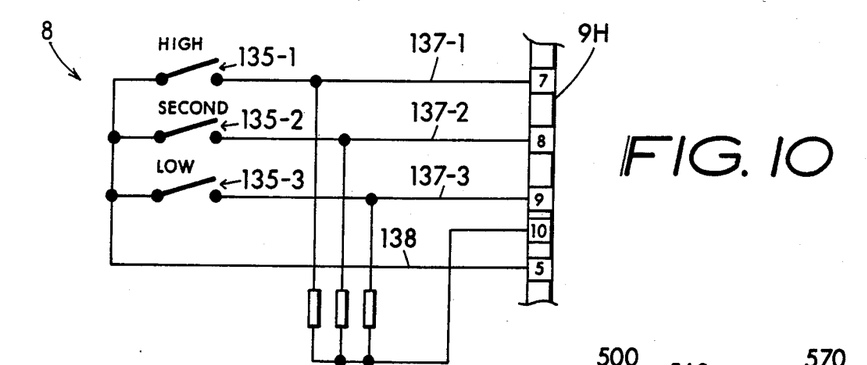
FIG. 10 Electrical hookup for the transmission gear selection sensors.

The usual connections which may be made with the gearbox assembly of the typical automatic transmission appears generally 8 in FIG. 10. Shown are three switches 135-1, 135-2, 135-3, each responsive to a "HIGH", "SECOND", "LOW" gear selection in the gearbox. These switches may be connected to the hydraulic pressure lines of the usual automatic transmission. In each gear selection mode, a unique combination of servo pressure lines are activated, and therefore by tapping into each of these respective pressure lines with a pressure sensitive switch, the shown switch functions may be satisfied. This action produces three distinctly separate flag signals 137-1, 137-2, 137-3 on pins 7, 8, 9 of connector 9H which returns through pin 5 of the connector on line 138.

Figure 11:
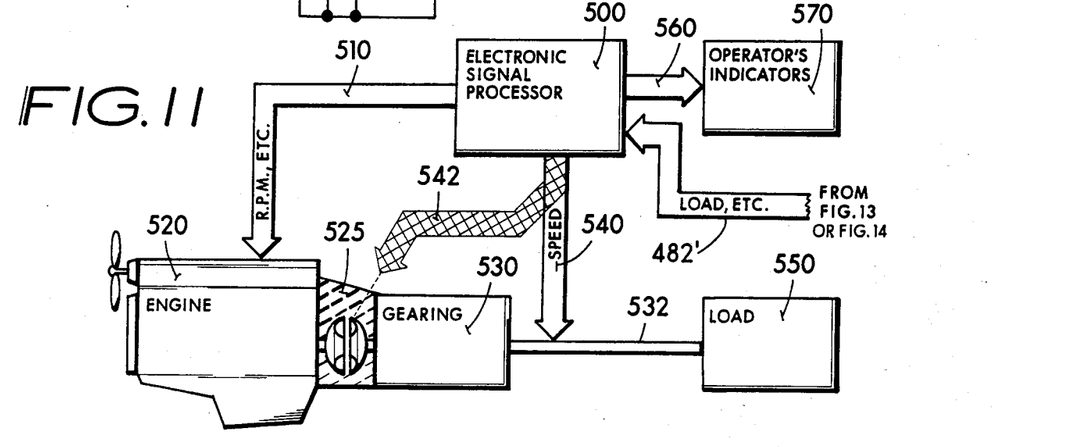
FIG. 11 Illustrative hookup of invention relative to a vehicle's several components.

An overview of how my instant invention might be coupled with a typical vehicle drive train arrangement appears in FIG. 11. The electronic signal processor 500 has one input group 510 which produces a signal proportional to the torque converter input member rotational speed which may be conveniently derived from engine r.p.m., together with a measure of engine temperature, etc. as unique signals indicative of engine 520 status. Furthermore inputs on line 540 couple with the output of the gearing 530, i.e. the driveshaft 532, to sense rotational speed of the output member end of the torque converter 525. Alternatively the coupling may be made directly to the output portion of the torque converter turbine by coupling 542 which reflects the input speed to the gearbox 530. The instant temperature of the transmission or torque converter may also be coupled with the processor 500, such as derived from the encoder 6 of FIG. 7. The driveshaft 532 is shown coupled with a load 550, typically being the driving wheels of the vehicle. Another signal group is shown to come in from the yet to be described FIG. 13 which is a signal combination 482' indicative of the vehicle's relative load. The output of the electronic signal processor 560 is a guidance signal which serves to activate the operator's indicator 570, thereby giving dynamic indication to the operator as to the best driving conditions.

Figure 12:
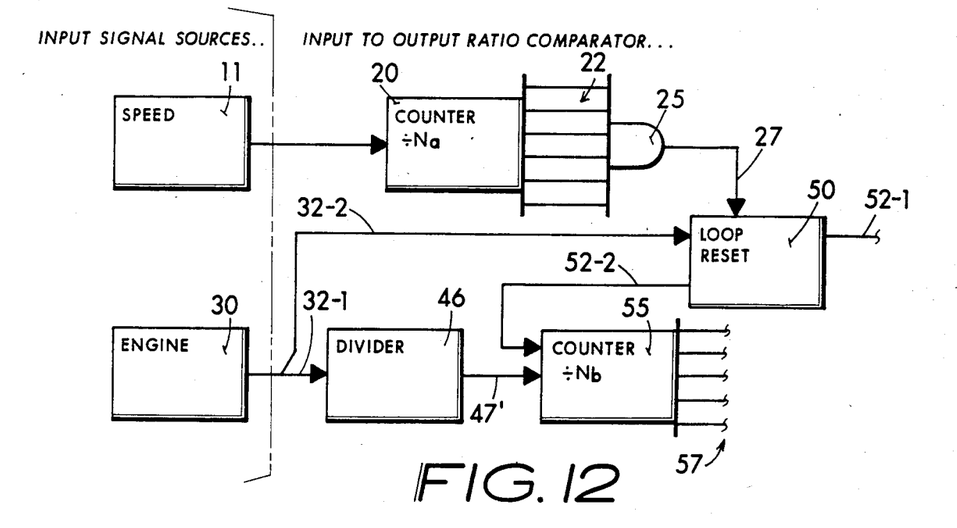
FIG. 12 Variation of FIG. 1 wherein torque converter output signal is derived directly from output member of the torque converter.

The embodiment taught in FIG. 12 shows the speed signal source 11 to be derived directly from the torque converter 425 output 442 of FIG. 11. The speed signal couples directly to the counter 20 of FIG. 1, without the intermediate divider 15, whilst the divider 46 is a fixed factor since the various gearbox ratios do not enter into the operative computations.

Figure 13:
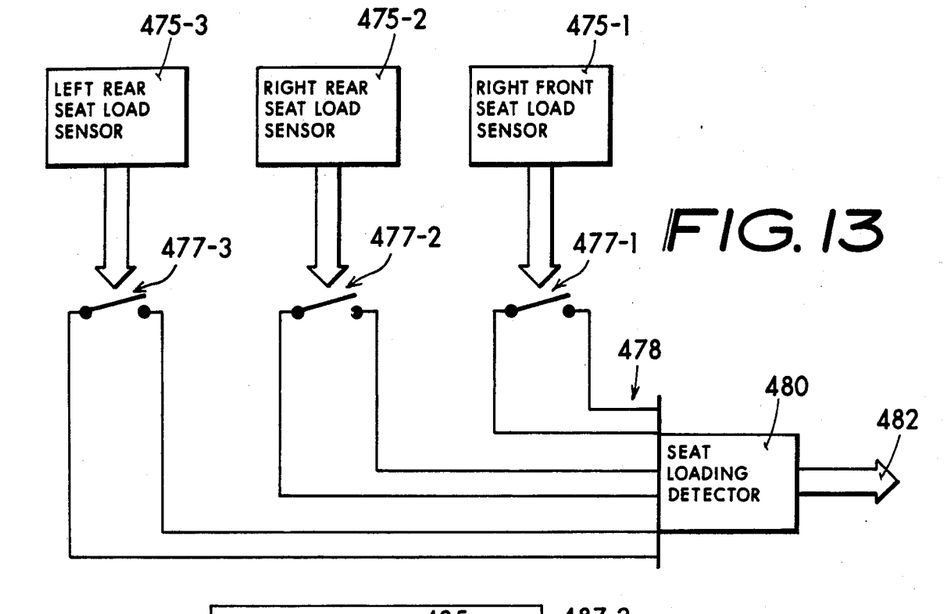
FIG. 13 Passenger seat load sensors coupled to modify guidance in proportion to vehicle loading.

The vehicle loading is determined in FIG. 13 by seat load sensors 475-1, 475-2, 475-3 which may be snap action switches positioned under the seat cushion of each passenger position, actuated by the cushion deflection produced by a typical passenger's body weight. The seat occupancy signals 478 are combined in detector 480, producing a signal 482 that couples with the load signal input 482' of FIG. 11.

Figures 14, 15:
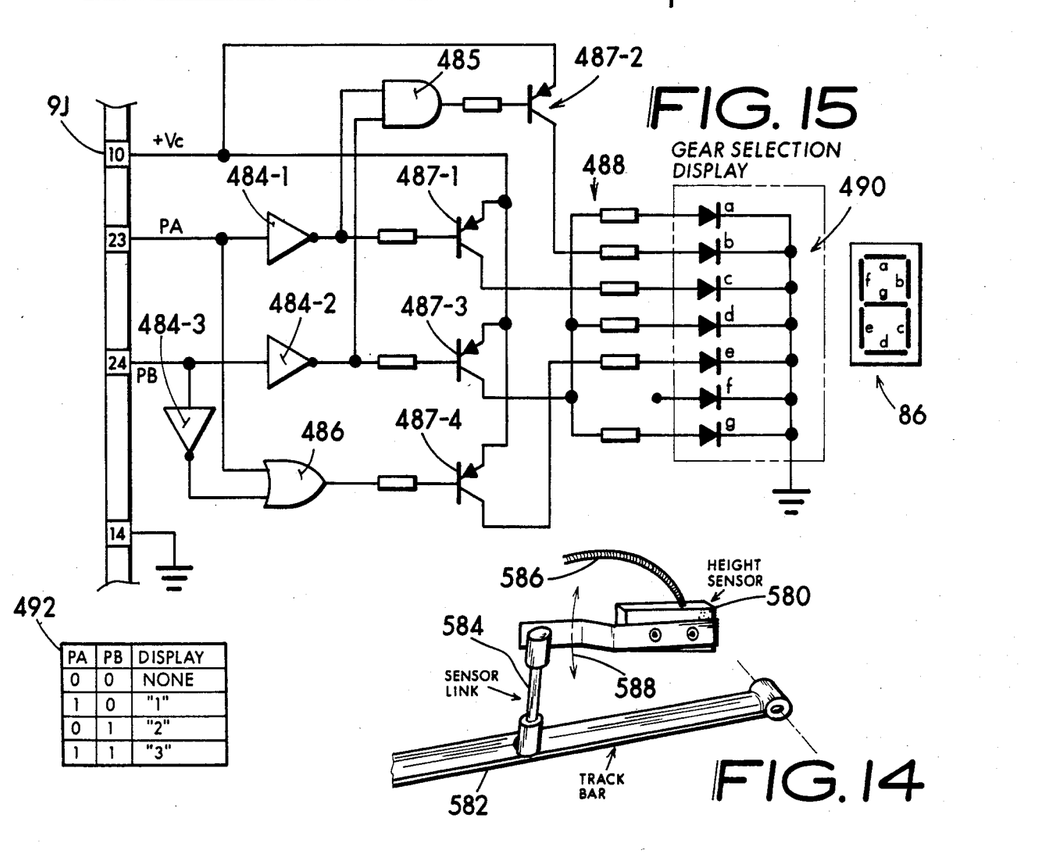
FIG. 14 Track bar sensor coupled to modify guidance in proportion to vehicle loading.
FIG. 15 Decoder circuit providing display of instantly engaged gear selection.

The vehicle loading is shown in FIG. 14 to be sensed by a height sensor 580 that couples through link 584 to the usual track bar 582 essential to the rear suspension of the modern automobile, typified by the 1982 Oldsmobile Ciera and Chevrolet Celebrity automobiles. Deflection 588 produced by vehicle loading produces a signal on cable 586 from the sensor that couples with the load signal input 482' to the electronic signal processor 500.

The real-time display of the instant automatic transmission gearbox selection is provided in the FIG. 15 embodiment. The PA, PB inputs on terminals 9J are decoded through the inverters 484-1, 484-2, 484-3 and gates 485, 486 to provide base drive signals to the transistors 487-1, 487-2, 487-3, 487-4 thereby driving the seven segment display 490 through resistors 488. The result is the segments of the display 86 light up to indicate "1-2-3" for the usual three automatic transmission gearbox selections.

While I describe my invention in terms of preferred embodiments, it is obvious that a person skilled in the art can devise equivalent embodiments and that such other obvious embodiments do not serve to circumvent the essence of my instant invention, as taught and claimed herewith.

What I claim is:

1. Driving aid method for use with a motor vehicle having a torque converter and at least providing operator guidance for more efficient operation thereof, comprising the steps therefor:
    a. producing a first signal proportional to the torque converter input member rotational speed;
    b. producing a second signal proportional to the torque converter output member rotational speed;
    c. obtaining the effective difference between the first signal and the second signal to produce a slip signal;
    d. coupling the instant value of the slip signal with address inputs of a vehicle performance profile memory to obtain an effective relative torque signal value weighted by values stored in the memory which relate to at least the torque converter coupling efficiency relative with absolute torque coupled therethrough; and,
    e. producing tell tale guidance to an operator of said vehicle which relates instantaneous values of the relative torque signal with most efficient operation of said vehicle.

2. Driving aid apparatus, adapted for use with a motor vehicle and comprising.
    a. torque converter means;
    b. engine means coupled with an input member of said converter means;
    c. load means coupled with an output member of said converter means;
    d. first sensor means coupled with the input member of said torque converter means, effective to produce a first speed signal proportional to the rotational speed of said input member;
    e. second sensor means coupled with the output member of said torque converter means, effective to produce a second speed signal proportional to the rotational speed of said output member;
    f. combining means coupled with said first sensor means and said second sensor means effective to produce a slip signal proportional to the effective difference between the first speed signal and the second speed signal;
    g. memory means coupled with said slip signal effective to produce at an output therefrom a relative torque signal value effectively weighted by a value stored in the memory means; and,
    h. telltale guidance means effectively coupled with said relative torque signal produced from said memory means output.

3. Driving aid apparatus of claim 2 wherein said first sensor means produces a first speed signal proportional to the engine output shaft revolutions per minute (r.p.m.).

4. Driving aid apparatus of claim 3 wherein said first sensor means produces a first speed signal derived from the ignition firing pulse rate of the engine means, whereby said pulse rate is effectively proportional to engine output member means r.p.m.

5. Driving aid apparatus of claim 2 wherein said load means further comprises a gearbox means which couples with the torque converter output means and said gearbox means includes an output shaft coupled with said second speed sensor means, whereby the sensor means effectively produces a second speed signal proportional to the torque converter output speed.

6. Driving aid apparatus of claim 5 wherein said torque converter output means couples with a gearbox means including an output shaft, wherein said second sensor means is responsive to the gearbox output shaft speed; wherein said gearbox provides more than one gear ratio combination therethrough and further includes a gearing sensor means producing a shift status signal effectively coupled with said signal combining means, thereby compensating the variable, torque converter produced, difference between the first speed signal and the second speed signal by the constant difference wrought by the fixed gearbox ratio.

7. Driving aid apparatus of claim 5 wherein said combining means includes input means responsive to instantaneous gearbox gear ratio combination selection.

8. Driving aid apparatus of claim 7 wherein said combining means provides an output effective to indicate the instantaneous gearbox selection.

9. Driving aid apparatus of claim 2 wherein second-sensor means comprises a magnetic pickup coupled effectively with said gearbox output shaft.

10. Driving aid apparatus of claim 2 wherein said second speed sensor produces a signal effectively proportional to the torque converter output speed.

11. Driving aid apparatus of claim 2 wherein said signal combining means includes an input responsive to instantaneous vehicle travel speed, coupled with said vehicle performance profile memory means thereby enabling the compensation of the tell tale guidance signal for normal speed related mobilization resistance of the said vehicle.

12. Driving aid apparatus of claim 2 wherein said tell tale guidance means comprises a visual display indicator for operator viewing, wherein said indicator provides performance indications relatable to the vehicle's economy of operation.

13. Driving aid apparatus of claim 12 wherein said tell tale guidance means comprises an array of light emitting diodes arranged to produce a bar graph display.

14. Driving aid apparatus of claim 2 wherein said tell tale guidance signal comprises at least one visual indicating device.

15. Driving aid apparatus of claim 2 wherein said combining means includes an input coupled with a vacuum data sensor, effective to produce a signal proportional to the vacuum in the manifold of the engine and signaling engine load status to the signal combining means, thereby giving some compensation to the tell tale guidance signal.

16. Driving aid apparatus of claim 2 wherein said combining means includes an input coupled with a temperature sensor means producing a signal indicative of the mechanical temperature of the engine, thereby compensating the tell tale guidance means signal.

17. Driving aid apparatus of claim 2 wherein at least one of said combining means and memory means includes an input coupled with a temperature sensor means producing a signal indicative of the mechanical temperature of the transmission, thereby compensating the tell tale guidance means signal.

18. Driving aid apparatus of claim 2 wherein said combining means includes an input responsive to vehicle load, serving to modify the tell tale guidance means indication value.

19. Driving aid apparatus of claim 18 wherein said vehicle load is predetermined by at least one seat occupancy sensor, responsive to vehicle passenger loading.

20. Driving aid apparatus of claim 18 wherein said vehicle load is predetermined by at least a sensor means effectively coupled with said vehicle's usual suspension means, responsive to displacement of said suspension means effected by various load combinations.

21. Driving aid apparatus of claim 2 wherein at least one of said combining means and said memory means further includes an input coupled with an operator adjustable means for providing variable "selected performance" compensation of the signal produced by the tell tale guidance means.

22. Driving aid apparatus of claim 2 wherein said signal combining means includes variability in the responsiveness of the difference between the first sensor means produced first speed signal and the second sensor means produced second speed signal; wherein said responsiveness is obtained by adjustable means under the control of the operator.

23. Driving aid apparatus of claim 2 wherein said combining means couples with semiconductor memory means effective to adapt the tell tale guidance means signal value to the predetermined performance profile of the attendant vehicle.

24. Driving aid apparatus of claim 2 wherein said vehicle performance profile memory means includes read-only memory means programmed to give compensation at the output therefrom for any combination of several inputs thereto as derived from at least one of the first and second combining means, and at least one of the several other inputs comprising vacuum data, temperature, stop light status, operator selected performance, instantaneous engine speed, and instantaneous vehicle speed.

* * * * *